(12) United States Patent
Cheng et al.

(10) Patent No.: US 9,365,779 B2
(45) Date of Patent: Jun. 14, 2016

(54) CATALYST FOR LIGHT OLEFINS AND LPG IN FLUDIZED CATALYTIC UNITS

(75) Inventors: Wu Cheng Cheng, Ellicott City, MD (US); Meenakshi Sundaram Krishnamoorthy, Columbia, MD (US); Ranjit Kumar, Clarksville, MD (US); Xinjin Zhao, Woodbine, MD (US); Michael Scott Ziebarth, Columbia, MD (US)

(73) Assignee: W. R. GRACE & CO.-CONN., Columbia, MD (US)

( * ) Notice: Subject to any disclaimer, the term of this patent is extended or adjusted under 35 U.S.C. 154(b) by 784 days.

(21) Appl. No.: 11/667,149

(22) PCT Filed: Nov. 3, 2005

(86) PCT No.: PCT/US2005/039916
§ 371 (c)(1),
(2), (4) Date: May 4, 2007

(87) PCT Pub. No.: WO2006/050487
PCT Pub. Date: May 11, 2006

(65) Prior Publication Data
US 2008/0093263 A1 Apr. 24, 2008

Related U.S. Application Data

(60) Provisional application No. 60/625,544, filed on Nov. 5, 2004.

(51) Int. Cl.
*B01J 29/00* (2006.01)
*B01J 29/08* (2006.01)
(Continued)

(52) U.S. Cl.
CPC .............. *C10G 11/182* (2013.01); *B01J 29/80* (2013.01); *B01J 35/0006* (2013.01); *C10G 11/05* (2013.01);
(Continued)

(58) Field of Classification Search
CPC .......... B01J 29/005; B01J 29/08; B01J 29/89
USPC .............................................. 508/67; 208/113
See application file for complete search history.

(56) References Cited

U.S. PATENT DOCUMENTS

| | | | |
|---|---|---|---|
| 3,130,007 A | 4/1964 | Breck | 23/113 |
| 3,442,792 A | 5/1969 | Eng et al. | 208/62 |

(Continued)

FOREIGN PATENT DOCUMENTS

| | | | |
|---|---|---|---|
| DE | 4114874 | 11/1991 | C10G 11/05 |
| EP | 0229609 | 7/1987 | B01J 29/28 |

(Continued)

OTHER PUBLICATIONS

FCC meets future needs, Hydrocarbon Engineering Jan. 2003 pp. 35-38.
(Continued)

*Primary Examiner* — Ellen McAvoy
*Assistant Examiner* — Ming Cheung Po
(74) *Attorney, Agent, or Firm* — Charles A. Cross (57) ABSTRACT

A catalyst composition comprising at least about 10% by weight pentasil, at least about 12% by weight Y-type zeolite at a pentasil to Y zeolite ratio of at least 0.25, and wherein the pentasil and Y zeolite comprise at least about thirty-five percent of the catalyst have been shown to optimize light olefin yields and LPG from FCC processes. Embodiments having matrix surface areas greater than 25 m²/g, phosphorous and rare earth are preferred. The compositions of this invention are particularly useful in typical fluid catalytic cracking (FCC) processes.

79 Claims, 1 Drawing Sheet (51) Int. Cl.
*B01J 29/89* (2006.01)
*C10G 11/18* (2006.01)
*B01J 29/80* (2006.01)
*B01J 35/00* (2006.01)
*C10G 11/05* (2006.01)
*B01J 29/40* (2006.01)
*B01J 37/00* (2006.01)

(52) U.S. Cl.
CPC ............... *C10G 11/18* (2013.01); *B01J 29/084* (2013.01); *B01J 29/088* (2013.01); *B01J 29/40* (2013.01); *B01J 37/0045* (2013.01); *B01J 2229/20* (2013.01); *B01J 2229/42* (2013.01); *C10G 2300/202* (2013.01); *C10G 2300/301* (2013.01); *C10G 2300/4025* (2013.01); *C10G 2300/4093* (2013.01); *C10G 2400/02* (2013.01); *C10G 2400/20* (2013.01); *C10G 2400/28* (2013.01)

(56) References Cited

U.S. PATENT DOCUMENTS

| | | | | |
|---|---|---|---|---|
| 3,444,097 | A | 5/1969 | Barclay | 252/455 |
| 3,449,070 | A | 6/1969 | McDaniel et al. | 23/111 |
| 3,702,886 | A | 11/1972 | Argauer et al. | 423/328 |
| 3,709,979 | A | 1/1973 | Chu | 423/328 |
| 3,758,403 | A | 9/1973 | Rosinski et al. | 208/120 |
| 3,867,308 | A | 2/1975 | Elliott, Jr. | 252/455 |
| 3,957,689 | A | 5/1976 | Ostermaier et al. | 252/455 |
| RE29,948 | E | 3/1979 | Dwyer et al. | 208/110 |
| 4,286,606 | A * | 9/1981 | Swain et al. | A24B 15/306 131/276 |
| 4,289,606 | A * | 9/1981 | Gladrow et al. | 208/120.1 |
| 4,309,280 | A | 1/1982 | Rosinski et al. | 208/120 |
| 4,331,694 | A | 5/1982 | Izod | 426/422 |
| 4,401,556 | A | 8/1983 | Bezman et al. | 208/111 |
| 4,415,438 | A | 11/1983 | Dean et al. | 208/120 |
| 4,458,023 | A | 7/1984 | Welsh et al. | 502/65 |
| 4,711,710 | A | 12/1987 | Chen et al. | 208/111 |
| 4,927,523 | A | 5/1990 | Donnelly | 208/120 |
| 4,980,053 | A | 12/1990 | Li et al. | 208/120 |
| 4,994,424 | A | 2/1991 | Leib et al. | 502/41 |
| 5,304,299 | A * | 4/1994 | Kumar | B01J 15/306 131/276 |
| 5,318,692 | A | 6/1994 | Eberly, Jr. et al. | 208/120 |
| 5,366,948 | A | 11/1994 | Absil et al. | 502/68 |
| 5,378,670 | A | 1/1995 | Kumar | 502/60 |
| 5,380,690 | A | 1/1995 | Zhicheng et al. | 502/65 |
| 5,382,351 | A | 1/1995 | Miller et al. | 208/120 |
| 5,395,808 | A | 3/1995 | Miller et al. | 502/7 |
| 5,472,594 | A * | 12/1995 | Tsang et al. | 208/114 |
| 5,846,402 | A | 12/1998 | Mandal et al. | 208/113 |
| 5,997,728 | A | 12/1999 | Adewuyi et al. | 208/120.01 |
| 6,211,104 | B1 | 4/2001 | Shi et al. | 502/67 |
| 6,528,447 | B1 | 3/2003 | Ghosh et al. | 502/65 |
| 6,566,293 | B1 * | 5/2003 | Vogt et al. | B01J 29/005 502/214 |
| 6,884,744 | B2 | 4/2005 | Cheng et al. | 502/60 |
| 2002/0049133 | A1 | 4/2002 | Ziebarth et al. | 502/64 |
| 2004/0011029 | A1 | 1/2004 | Wagner et al. | 60/295 |
| 2005/0020867 | A1 * | 1/2005 | Xie et al. | C07C 4/06 585/651 |

FOREIGN PATENT DOCUMENTS

| | | | | |
|---|---|---|---|---|
| EP | 0909582 | * | 4/1999 | ............... B01J 29/06 |
| EP | 0909582 A1 | * | 4/1999 | |
| EP | 0909582 A1 | * | 4/1999 | ............... B01J 29/80 |
| EP | 600686 | | 7/2001 | |
| WO | WO 98/41595 | | 9/1998 | ............ C10G 11/05 |
| WO | 0031215 | | 6/2000 | ............ C10G 11/02 |
| WO | WO 02/083304 | | 10/2002 | ............... B01J 29/00 |

OTHER PUBLICATIONS

G. W. Young, "Realistic Assessment of FCC Catalyst Performance in the Laboratory," in Fluid Catalytic Cracking: Science and Technology, J. S. Magee and M. M. Mitchell, Jr. Eds., Studies in Surface Science and Catalysis, vol. 76, p. 257, Elsevier Science Publishers B.V., Amsterdam 1993, ISBN 0-444-89037-8.

G. W. Young, G. D. Weatherbee, and S. W. Davey, "Simulating Commercial FCCU yields with the Davison Circulating Riser (DCR) pilot plant unit," National Petroleum Refiners Association (NPRA) Paper AM88-52.

J. Catalysis, 67, 218-222 (1981).

"ZSM-5 Additive in Fluid Catalytic Cracking II, Effect of Hydrogen Transfer Characteristics of the Base Cracking Catalysts and Feedstocks", Zhao et al., Ind. Eng. Chem. Res., vol. 38, pp. 3854-3859 (1999).

Dharia et al., Hydrocarbon Processing-International Edition, vol. 83, Part 4, p. 61-65.

* cited by examiner

CATALYST FOR LIGHT OLEFINS AND LPG IN FLUDIZED CATALYTIC UNITS

CROSS-REFERENCE TO RELATED APPLICATIONS

This application is the U.S. national phase of International Application PCT/US2005/039916, filed Nov. 3, 2005, claiming the benefit of U.S. Provisional Application No. 60/625,544, filed Nov. 5, 2004.

BACKGROUND

1. Field of the Invention

The invention relates to use of catalysts to enhance yields of olefins and liquefied petroleum gas (LPG) produced in a fluidized catalytic cracking (FCC) process.

2. Description of Related Art

A discussion relating to use of ZSM-5-based catalysts to enhance olefin yields in FCC processes is found in U.S. Pat. No. 5,997,728. The following description of related art is based on that discussion.

Catalysts used in FCC processes are in particle form, usually have an average particle size in the range of 20 to 200 microns, and circulate between a cracking reactor and a catalyst regenerator. In the reactor, hydrocarbon feed contacts hot, regenerated catalyst which vaporizes and cracks the feed at about 400° C. to 700° C., usually 500° C. to about 550° C. The cracking reaction deposits carbonaceous hydrocarbons or coke on the catalyst, thereby deactivating it. The cracked products are separated from the coked catalyst. The coked catalyst is stripped of volatiles, usually with steam, in a catalyst stripper and then regenerated. The catalyst regenerator burns coke from the catalyst with oxygen containing gas, usually air, to restore catalyst activity and heat catalyst to, e.g., 500° C. to 900° C., usually 600° C. to 750° C. The hot regenerated catalyst recycles to the cracking reactor to crack more fresh feed. Flue gas from the regenerator may be treated to remove particulates or convert CO, and then discharged into the atmosphere. The FCC process, and its development, is described in the Fluid Catalytic Cracking Report, Amos A. Avidan, Michael Edwards and Hartley Owen, in the Jan. 8, 1990 edition of the Oil & Gas Journal.

The product distribution from current FCC processes comprises a number of constituents, with gasoline being of primary interest to most refiners. Light olefins and LPG are also found in the FCC product, and are increasingly becoming of interest to refiners as those products become more valuable. The light olefins produced can be used for a number of purposes, e.g., they are upgraded via sulfuric or HF alkylation to high quality alkylate. LPG is used for cooking and/or heating purposes. Accordingly, operators of FCC units can vary the content of their products depending upon the markets they are serving and the value associated with each of the components found in an FCC product.

Propylene is a particular light olefin in high demand. It is used in many of the world's largest and fastest growing synthetic materials and thermoplastics. Refiners are relying more and more on their FCC units to meet the increased demand for propylene, thus shifting the focus of the traditional FCC unit away from transportation fuels and more toward petrochemical feedstock production as operators seek opportunities to maximize margins.

If a refinery cannot expand its existing unit, FCC operators have rather limited options for increasing light olefin production. Reported options include:

a. FCC processes employing ZSM-5 and large pore zeolite that share matrix, i.e., an integral catalyst.
b. FCC processes using additive ZSM-5 catalyst.
c. Production of cracked gas from gas oil over pentasil zeolites at high cracking severity.

These approaches are reviewed in more detail below.

Integral Catalysts Containing Large Pore Zeolite Catalyst+ZSM-5

U.S. Pat. No. 3,758,403 discloses adding ZSM-5 to conventional large pore zeolite cracking catalyst formulations, including adding ZSM-5 during manufacture of the large pore zeolite catalyst particles so that the ZSM-5 is integrated into the catalyst particle. Based on '403, use of large pore zeolite cracking catalyst containing large amounts of ZSM-5 additive that has been integrated into the catalyst gives only modest increases in light olefin production. A 100% increase in ZSM-5 content (from 5 wt % ZSM-5 to 10 wt % ZSM-5) increased the propylene yield less than 20%, and decreased slightly the potential gasoline yield ($C_5$+gasoline plus alkylate).

U.S. Pat. No. 6,566,293 discloses another type of integral catalyst wherein phosphorus is combined with the ZSM-5 and calcined prior to their addition to matrix, and optionally, and in certain instances, preferably large pore zeolite Y. The resulting slurry of calcined ZSM-5/phosphorus and matrix-containing slurry is then spray dried into catalyst. The '293 patent reports that these catalysts are efficient in olefins production, while also maintaining bottoms cracking. See also "FCC Meets Future Needs", *Hydrocarbon Engineering*, January 2003.

ZSM-5 Additives

Refiners have also been adding ZSM-5 containing catalysts as additive catalysts to their FCC units, with 10-50 wt %, more usually 12 to 25 wt %, ZSM-5 in an amorphous support. In this instance, the ZSM-5 is added as particles that are separate from the particles containing the conventional large pore zeolite catalysts. ZSM-5 has been primarily added to FCC units for gasoline octane enhancement, but as mentioned above, it is also used to enhance light olefins. Such additives have physical properties that allow them to circulate with the large pore zeolite cracking catalyst. Using ZSM-5 in a separate additive allows a refiner to retain the ability to use the myriad types of commercially available large pore zeolite cracking catalyst available today.

U.S. Pat. No. 4,309,280 discloses adding very small amounts of powdered, neat ZSM-5 catalyst, characterized by a particle size below 5 microns. Adding as little as 0.25 wt % ZSM-5 powder to the FCC catalyst inventory increased LPG production by 50%. Small amounts of neat powder behaved much like larger amounts of ZSM-5 disposed in larger particles.

A method of adding a modest amount of ZSM-5 to an FCC unit is disclosed in U.S. Pat. No. 4,994,424. ZSM-5 additive is added to the equilibrium catalyst in a programmed manner so an immediate boost in octane number, typically ½-2 octane-number, is achieved.

U.S. Pat. No. 4,927,523, discloses adding large amounts of ZSM-5 to a unit without exceeding wet gas compressor limits. Large amounts were added, and cracking severity reduced until the ZSM-5 activity tempered from circulating through the FCC unit for several days.

Development on ZSM-5 additives has also been directed at stabilizing them with phosphorus or making the additives more attrition resistant. Phosphorus stabilized ZSM-5 additive is believed to retain activity for a longer period of time, thereby reducing the makeup rate of ZSM-5 additive required. Even with phosphorus stabilization, refiners interested in maintaining gasoline yield fear dilution of the large pore zeolite cracking catalyst by addition of ZSM-5, e.g., over 2 or 3 wt % ZSM-5 crystal. Use of more than 5 or 10 wt % additive will reduce yields of gasoline and seriously impair conversion. Most refiners therefore are still faced with using ZSM-5 additives at amounts significantly smaller than the upper limits recited above.

Moreover, the aforementioned Hydrocarbon Engineering article highlights that adding more ZSM-5-based additives, even those that are stabilized by phosphorus, has diminishing returns, because more Y zeolite is usually added to reduce cracking catalyst dilution caused by the additional amount of ZSM-5. The addition of more zeolite Y in turn increases hydrogen transfer to the molecules that ZSM-5 converts into olefins. The net effect of increasing the Y zeolite is reduced light olefins because the olefins saturated by the hydrogen are not available for conversion by ZSM-5 into light olefins. As a result the authors suggest adopting a new embodiment of integral catalyst such as that described above.

Based on the experience embodied in the aforementioned patents, ZSM-5 additive has been recognized as a way to increase $C_3$ and $C_4$ olefin yields and gasoline octane. It, however, is used at the cost of loss in gasoline yield. It is therefore submitted that based on the understanding in the art ZSM-5 would be of most benefit to refiners when used in small amounts, preferably in FCC units operating at modest severity levels.

The art has also recognized that olefins yields from FCC processes can be affected by rare earth content of Y zeolite-based catalysts containing relatively low level of ZSM-5-based olefins additives. See "ZSM-5 Additive in Fluid Catalytic Cracking II, Effect of Hydrogen Transfer Characteristics of the Base Cracking Catalysts and Feedstocks", Zhao et al., Ind. Eng. Chem. Res., Vol. 38, pp. 3854-3859 (1999). For example, rare earth is widely used in zeolite Y-based catalysts to increase activity and conversion of the feedstock into FCC products. These exchanged zeolites are then formulated with matrix and binder to form the finished catalyst compositions, or further blended with ZSM-5 to form the final catalyst additive. Typical REY-based catalyst contains about 2% by weight rare earth, which usually equates to the Y zeolite containing about 5% by weight, based on the zeolite. Zhao et al. have found, however, that using REY having 2% by weight rare earth reduces olefins yields when compared to Y zeolites that contain smaller amounts of RE, including no RE at all. It is believed RE exchanged Y zeolite increases hydrogen transfer reactions, which in turn leads to saturation of olefins in the gasoline range. As indicated earlier, olefin molecules in the gasoline range can be converted into propylene and butylenes, and their saturation removes molecules that could be converted into light olefins. Accordingly, there is a suggestion in the art that one could enhance olefin yields by reducing rare earth content when formulating catalyst containing RE exchanged zeolites and ZSM-5.

High Severity Conversion Using Pentasil

U.S. Pat. No. 4,980,053, describes examples of converting vacuum gas oil to more than 50 wt % cracked gas over zeolites ranging from pentasil to USY, and mixtures thereof. The process is basically a pyrolysis process, which uses a catalyst to operate at somewhat milder conditions than thermal pyrolysis processes.

The catalysts A-D described in the '053 patent were used in a process run at conditions much more severe than those used in typical catalytic cracking—580° C. (1076° F.), at a 1 LHSV, a cat:oil ratio of 5, and steam:hydrocarbon ratio of 0.3.

| | Catalyst | | | |
|---|---|---|---|---|
| wt % of: | A | B | C | D |
| cracked gas | 52.0 | 51.2 | 54.0 | 55.6 |
| propylene | 11.61 | 17.39 | 21.56 | 21.61 |
| butylene | 15.64 | 14.47 | 15.64 | 15.09 |
| C5-205 C | 31.0 | 33.1 | 27.0 | 27.5 |
| Conversion | 93.3 | 90.3 | 87.6 | 89.1 |

While the zeolite content of the catalysts is not specified, the patentees of the '053 patent report that "the yields of gaseous olefins over catalyst C (Pentasil) and D (D=mix of pentasil+USY) are higher than the others." As far as gasoline yields, and conversion, the mixture in D gives less conversion and less gasoline yield than a single particle catalyst (A=Pentasil+REY). Use of a mixture also reduced butylenes yields slightly, as compared to single particle catalyst A. Catalyst B is reported to be a USY-type zeolite catalyst.

Example 2 of '053 reports production of fairly aromatic gasolines, containing more than 50 wt % aromatics. This was to be expected from the high temperatures and severe conditions. The octane number of the gasoline was 84.6 (motor method). The di-olefin content of the gasoline was not reported.

These results show use of separate additives of pentasil zeolite can reduce conversion and butylene and gasoline yield, as compared to use of single particle catalyst with both types of zeolite in a common matrix, during a pyrolysis process.

As a solution to the various problems mentioned above, U.S. Pat. No. 5,997,728 discloses a catalytic cracking process for converting a heavy hydrocarbon feed to lighter products comprising; charging a heavy hydrocarbon feed comprising hydrocarbons boiling above 650° F. to a riser catalytic cracking reactor; charging a hot fluidized solids mixture, from a catalyst regenerator to the base of said riser reactor, said mixture comprising: a physical mixture of regenerated base FCC cracking catalyst and separate particles of shape selective zeolite cracking catalyst additive, said mixture containing 87.5 to 65 wt % base FCC catalyst and 12.5 to 35 wt % additive, and wherein said additive comprises a catalytically effective amount of a zeolite having a silica:alumina ratio above 12 and a Constraint Index of 1-12 (e.g. ZSM-5) in an amorphous support. The feed is catalytically cracked at conditions including a riser outlet temperature of about 925 to 1050° F. to produce catalytically cracked products including ethylene, propylene, and a $C_5$+ gasoline fraction. The cracked product from this process is said to produce after fractionation at least 44.0 wt % $C_5$+ 15 LV % propylene, (i.e., about 9% by weight propylene), and no more than 2.0 wt % ethylene.

SUMMARY OF RELATED ART

Based on the teachings of the earlier mentioned '403 patent, use of ever increasing amounts of ZSM-5 and large pore zeolite in a common particle produced rapidly diminishing returns from the incremental amounts of ZSM-5.

Using separate ZSM-5 additives in large amounts produces diminishing returns at high severity. The authors of '728 suggest that most refiners were tending to use a more severe operation to increase conversion, and improve gasoline yield and octane.

Based on the pyrolysis work reported in '053, use of large amounts of separate ZSM-5 additive at high severity reduced both conversion and gasoline yield, and would produce a highly aromatic gasoline, which is not desirable for reasons not further addressed herein.

The authors of '728 suggest that higher yields of light olefins are needed by refiners and that there seems to be no attractive way to produce them using existing FCC technology. The authors of '728 decided to conduct experimental work with larger amounts of separate additive ZSM-5 catalyst, and with somewhat higher severity FCC operation.

The authors of '728 report that yields of light olefins can be optimized while still maintaining gasoline yields by using unprecedented amounts of shape selective additive catalyst, and that these unexpected yield patterns can be achieved at more severe catalytic cracking conditions, e.g., higher catalyst to oil ratios. However, refiners that desire higher olefin yields, but are not also looking to maintain gasoline yields, would not be motivated to use the catalysts described in '728 to maximize olefins. Those catalysts have at least 65% base catalyst containing Y-type zeolite, which are modified with rare earth. Y-type zeolites exchanged with rare earth have been shown by Zhao et al. to saturate gasoline olefins, thereby removing molecules that would be available for conversion into propylene and butylenes. Moreover, most FCC units are not designed to accommodate conditions that are more severe than those typically used in FCC processes.

SUMMARY OF THE INVENTION

The increase in the number of refiners wishing to obtain propylene yields significantly above 10 wt. % and LPG yields above 30 wt. % poses a new challenge for existing catalyst technology, as these yields typically cannot be achieved with currently available ZSM-5 additives. Excessive amounts of ZSM-5 based additive in the FCC catalyst inventory have been shown to dilute the base catalyst activity and reduce unit conversion. An objective of this invention thus is to develop a catalyst where the cracking function is modified through the inclusion of shape-selective cracking function that ultimately converts gasoline range hydrocarbons to light olefins, e.g., propylene, and LPG. More particularly, it has been discovered that specific formulations of Y-type zeolite and relatively high amounts of pentasil can be used to enhance light olefin yields to levels not expected by the prior art. Unless expressly indicated otherwise, "light olefins" is meant to refer to $C_3$ and $C_4$ olefins. More specifically, the formulations of this invention comprise:
 a. about twelve to about sixty percent by weight Y-type zeolite;
 b. at least about ten percent by weight pentasil, wherein pentasil and Y-type zeolite is present in a weight ratio of at least 0.25 and no more than 3.0; and
 c. the Y-type zeolite and pentasil comprises at least about thirty-five percent by weight of the catalyst composition.

In preferred embodiments, the Y-type zeolite and pentasil are in separate particles, i.e., the Y-type zeolite is present in particles that are separate from particles containing the pentasil. It is also preferable that the overall catalyst compositions comprise matrix having surface area of at least 25 $m^2/g$, up to about twelve percent by weight phosphorus (as $P_2O_5$) and also up to about eight percent by weight rare earth (as an oxide) based on the catalyst composition. It is especially preferred that the catalyst has a total surface area (matrix surface area plus zeolite surface area) of at least about 150 $m^2/gram$. These formulations can be manufactured to have relatively good attrition resistance (having a Davison Index less than 20).

Without being bound by any particular theory, it has been discovered that by carefully selecting the amount of rare earth in exchanged Y-type zeolites and using high surface area matrix, one can increase the content of Y-type zeolite and pentasil above those amounts typically found in standard FCC catalyst, and thereby then, enhancing olefin yields beyond those catalysts available currently.

It is believed that catalyst formulations containing Y-type zeolites and pentasils act in two ways to produce olefins. Without being bound by any particular theory, it is believed the Y-type zeolite and matrix converts feedstock from large molecules into a product of which a large percentage contains gasoline range olefinic molecules ($C_5$ to $C_{12}$.) The pentasil converts these gasoline range molecules into smaller olefinic molecules, e.g., $C_3$ and $C_4$ olefins. Accordingly, when increasing pentasil at the expense of Y-type zeolite in a given formulation there is a point where the amount of olefins produced by the pentasil reaches a plateau. Indeed, the plateau is reflected in the prior art that notes diminishing returns as one increases the amount of pentasil in the catalyst. In other words, if too much pentasil is added at the expense of Y zeolite, fewer gasoline range olefins are available for conversion by ZSM-5 to light olefins. Therefore there has been a tendency in the past to not decrease the amount of Y-type zeolite and accepting the incremental production of light olefins from pentasil addition. Indeed the earlier mentioned Hydrocarbon Engineering article suggests an integral catalyst approach to overcome this problem.

Applicants, however, have developed a formulation wherein one increases the amount of Y-type zeolite that can be included in the catalyst composition, employs relatively high amounts of pentasil, and is able to increase light olefin production. Without being held to any particular theory, it is believed that the conversion activity of the Y-type zeolite is more fully utilized in a role of enhancing light olefins production as opposed to being limited as the result of being concerned by its hydrogen transfer activity. For example, the Y type zeolite in preferred embodiments of the invention contains a certain amount of rare earth, which previous art suggests to limit to levels well below 2% by weight. The invention furthermore includes a relatively high surface area matrix, e.g., that of 25 $m^2/g$ or greater. In particular, by choosing the aforementioned parameters, one is able to introduce enough Y-type zeolite to maintain conversion of feedstock into olefinic molecules in the gasoline range, but at the same time (through use of somewhat reduced levels of rare earth) achieve some reduction in saturation of those molecules, thereby providing more molecules that the pentasil can convert to a light olefin. Preparing the Y-type zeolite in this fashion in combination with increasing the amount of pentasil provides a formulation that produces light olefins and LPG by a magnitude not recognized by previous catalyst compositions. It is believed that the increased matrix surface area further acts to enhance olefin yields from the invention due to the invention's activity in producing gasoline range molecules that the pentasil can convert into olefins.

In summary, the catalysts of the invention comprise Y-type zeolite that provides excellent stability and activity retention. The intrinsic hydrogen transfer activity of the Y-type zeolite is selected to maximize gasoline range hydrocarbons that are subsequently converted to LPG, notably propylene, by the pentasil. The catalyst also preferably comprises matrix that can upgrade LCO to lighter products while maintaining low coke and dry gas yields. Thus, the preferred matrix further enhances the yield of gasoline range hydrocarbons for conversion to LPG by the pentasil. The invention also can be made with binders so that the final catalyst exhibits excellent attrition resistance for enhanced unit retention.

DETAILED DESCRIPTION

Y-Type Zeolite

Y-type zeolites suitable for this invention include those typically used in FCC processes. These zeolites include zeolite Y (U.S. Pat. No. 3,130,007); ultrastable Y zeolite (USY) (U.S. Pat. No. 3,449,070); rare earth exchanged Y (REY) (U.S. Pat. No. 4,415,438); rare earth exchanged USY (REUSY); dealuminated Y (DeAlY) (U.S. Pat. No. 3,442,792; U.S. Pat. No. 4,331,694); and ultrahydrophobic Y (UHPY) (U.S. Pat. No. 4,401,556). These zeolites are large-pore molecular sieves having pore sizes greater than about 7 Angstroms. In current commercial practice most cracking catalysts contain these zeolites.

Zeolites prepared from treating clay with acid are also suitable for use as the Y type zeolite in the invention. Such zeolites and methods for preparing the same are known and are described in U.S. Pat. No. 5,395,808, the contents of which are incorporated by reference.

Standard Y-type zeolite is typically produced by crystallization of sodium silicate and sodium aluminate. The zeolite can be converted to USY-type by dealumination, which increases the silicon/aluminum atomic ratio of the parent standard Y zeolite structure. Dealumination can be achieved by steam calcination or by chemical treatment.

Certain embodiments of Y zeolites may require reduction of the sodium content, as well as conversion to the acid (protonated) form of zeolite Y. For example, this can be accomplished by employing the procedure of converting the zeolite to an intermediate ammonium form through ammonium ion exchange, followed by calcination to provide the hydrogen form. The source of the ammonium ion is not critical, and the source can be ammonium hydroxide or an ammonium salt such as ammonium nitrate, ammonium sulfate, ammonium chloride and mixtures thereof. These reagents are usually in aqueous solutions. By way of illustration, aqueous solutions of the aforementioned ammonium sources (i.e., $NH_4OH$, $NH_4NO_3$, $NH_4Cl$ and $NH_4Cl/NH_4OH$) have been used to effect ammonium ion exchange. The pH of the ion exchange is generally maintained at about 3 to 8. Ammonium exchange may be conducted for a period of time ranging from about 0.5 to about 20 hours at a temperature ranging from ambient up to about 100° C. The exchange may be conducted in a single stage or in multiple stages. Calcination of the ammonium exchanged zeolite will produce its acid form. Calcination can be effected at temperatures up to about 550° C. The conditions of these procedures are well known in the art.

Rare earth exchanged Y-type zeolites used in the invention can be prepared by ion exchange, during which cations, e.g., sodium cations, present in the zeolite structure are replaced with rare earth cations. The exchange solutions usually contain mixtures of rare earth metal salts such as those salts of cerium, lanthanum, neodymium, praseodymium, naturally occurring rare-earths and mixtures thereof and are used to provide REY and REUSY grades. These zeolites may be further calcined, e.g., to provide CREY and CREUSY types of material. Indeed, REY, REUSY CREY, and CREUSY are the most preferred for this invention.

Rare earth can also be included in the invention by adding rare earth containing particles into a spray drier feed containing the Y-type zeolite, adding a rare earth compound, e.g., rare earth salt, to the spray drier feed, or by treating the spray dried Y-type zeolite particle with a rare earth-containing solution.

Metal cation exchanged zeolites, e.g., MgUSY, ZnUSY and MnUSY zeolites, can also be employed and are formed by using exchange solutions containing the metal salts of Mg, Zn or Mn or mixtures thereof in the same manner as described above with respect to the formation of REUSY except that salts of magnesium, zinc or manganese is used in lieu of the rare-earth metal salt used to form REUSY.

When including rare earth with the Y-type zeolite for use in this invention, the amount of rare earth is not only selected to provide activity and conversion, but also selected at an amount that does not overly saturate olefinic molecules in the gasoline range, e.g., $C_5$ to $C_{12}$. For example, when rare earth is included in the invention via exchange onto the Y-type zeolite, the amount of rare earth based on the zeolite Y for this invention is usually no more than about sixteen percent by weight, as measured by rare earth oxide. The rare earth content (as rare earth oxide) of this invention, via exchange or any other source mentioned above, however, is typically in the range of about 2 to about 8% by weight based on the Y-type zeolite. When adding rare earth and type Y zeolite to the invention in the same particle, the amount of rare earth can comprise up to 10% by weight of any Y-type zeolite-containing particle, but in general should only comprise about one to about eight percent by weight of Y-type zeolite-containing catalyst particles. Based on the total catalyst composition, rare earth (as rare earth oxide) can comprise up to about eight percent, but more typically rare earth comprises about 0.5 to about 6% of the total catalyst composition. The aforementioned ranges are summarized in the Table below.

| Basis | General Range Of Rare Earth (% by weight) | More Typical Range Of Rare Earth (% by weight) |
|---|---|---|
| Y Zeolite | 0-16 | 2-8 |
| Y Zeolite-Containing Catalyst Particles | 0-10 | 1-8 |
| Total Catalyst Composition | 0-8 | 0.5-6 |

The unit cell size of a preferred fresh Y-zeolite is about 24.45 to 24.7 Å. The unit cell size (UCS) of zeolite can be measured by x-ray analysis under the procedure of ASTM D3942. There is normally a direct relationship between the relative amounts of silicon and aluminum atoms in the zeolite and the size of its unit cell. This relationship is fully described in Zeolite Molecular Sieves, Structural Chemistry and Use (1974) by D. W. Breck at Page 94, which teaching is incorporated herein in its entirety by reference. Although both the zeolite, per se, and the matrix of a fluid cracking catalyst usually contain both silica and alumina, the $SiO_2/Al_2O_3$ ratio of the catalyst matrix should not be confused with that of the zeolite. When an equilibrium catalyst is subjected to X-ray analysis, it only measures the UCS of the crystalline zeolite contained therein.

In general, the amount of Y-type zeolite in the catalyst composition is in an amount sufficient to produce molecules in the gasoline range. This invention generally contains about 12 to about 60% by weight Y-type zeolite, with specific amounts depending on amount of activity desired. Generally increasing the amount of Y enhances gasoline yield, which in turn provides molecules for the pentasil to convert into olefins. In certain embodiments the invention contains Y type zeolite in amounts such that gasoline produced by the Y type zeolite is cracked further by the zeolite into olefins. The amount of Y-type zeolite is also generally such that the total amount of Y-type zeolite and the pentasil described below comprises at least about 35% by weight of the total catalyst composition.

Pentasil

The pentasils suitable for this invention include those zeolite structures having a five-membered ring. In preferred embodiments the catalyst composition of this invention comprises one or more pentasils having an X-ray diffraction pattern of ZSM-5 or ZSM-11. Suitable pentasils include those described in U.S. Pat. No. 5,380,690, the contents incorporated by reference. Commercially available synthetic shape selective zeolites are also suitable.

The preferred pentasils generally have a Constraint Index of 1-12. Details of the Constraint Index test are provided in *J. Catalysis*, 67, 218-222 (1981) and in U.S. Pat. No. 4,711,710 both of which are incorporated herein by reference. Such pentasils are exemplified by intermediate pore zeolites, e.g., those zeolites having pore sizes of from about 4 to about 7 Angstroms. ZSM-5 (U.S. Pat. No. 3,702,886 and Re. 29,948) and ZSM-11 (U.S. Pat. No. 3,709,979) are preferred. Methods for preparing these synthetic pentasils are well known in the art. The preferred embodiments of pentasil have relatively low silica to alumina ratios, e.g., less than 100:1, preferably less than 50:1. A preferred embodiment of this invention has a silica to alumina ratio less than 30:1. The pentasil may also be exchanged with metal cations. Suitable metals include those metal dopants described in US 2004/011029 the contents of which are incorporated by reference. Briefly these metals can be alkaline earth metals, transition metals, rare earth metals, phosphorus, boron, noble metals and combinations thereof.

The pentasil is generally present in amounts sufficient to enhance the olefin yields compared to Y-type zeolite-based compositions that do not contain such pentasils. More specifically, it has been discovered that by formulating the catalyst composition to contain pentasil in a range of about 10% to about 50%, and a pentasil to Y-type zeolite ratio of at least 0.25, a catalyst composition containing significant amounts of both Y-type zeolite and pentasil can provide enhanced olefin yields, especially when the catalyst has the aforementioned amounts of rare earth and matrix surface area. Typical embodiments of the invention comprise about 10% to about 30% by weight pentasil, and more typically the pentasil content is in the range of about 10 to about 20% by weight. As indicated earlier, the amount of pentasil present is generally such that the amount of pentasil and Y-type zeolite described above is at least 35% by weight of the total catalyst composition. The ratio of pentasil to Y type zeolite should in general be no more than about 3.0.

Other Components

The catalyst composition also preferably contains matrix, which is typically an inorganic oxide that has activity with respect to modifying the product of the FCC process, and in particular, activity to produce gasoline range olefinic molecules, upon which the pentasils described above can act. Inorganic oxides suitable as matrix include, but are not limited to, non-zeolitic inorganic oxides, such as silica, alumina, silica-alumina, magnesia, boria, titania, zirconia and mixtures thereof. The matrices may include one or more of various known clays, such as montmorillonite, kaolin, halloysite, bentonite, attapulgite, and the like. See U.S. Pat. No. 3,867,308; U.S. Pat. No. 3,957,689 and U.S. Pat. No. 4,458,023. Other suitable clays include those that are leached by acid or base to increase the clay's surface area, e.g., increasing the clay's surface area to about 50 to about 350 m$^2$/g as measured by BET. The matrix component may be present in the catalyst in amounts ranging from 0 to about 60 weight percent. In certain embodiments, alumina is used and can comprise from about 10 to about 50 weight percent of the total catalyst composition.

The matrix is usually provided and incorporated into the catalyst when formulating the catalyst as particles. When preparing the composition from a blend of pentasil-containing particles and Y-type zeolite-containing particles, the matrix is added to one or both sets of particles. Although not preferred, the matrix can also be added to a blend of pentasil and Y-type zeolite which is then spray dried together to form what is described earlier as an integral catalyst, i.e., both components are found in each catalyst particle. Such integral catalysts, however, suffer from reduced activity compared to a combination of separately prepared catalysts. In either the blend or integral embodiment, it is preferable to select a matrix that provides a surface area (as measured by BET) of at least about 25 m$^2$/g, preferably 45 to 130 m$^2$/g. It is particularly preferable that the particles containing the Y-type zeolite comprise the aforementioned high surface area matrix. The examples below indicate that a higher surface area matrix enhances olefins yield. The total surface area of the catalyst composition is generally at least about 150 m$^2$/g, either fresh or as treated at 1500° F. for four hours with 100% steam.

The catalyst composition also optionally, but preferably, contains phosphorus. The phosphorus is selected to stabilize the pentasil. The phosphorus can be added to the pentasil prior to forming catalyst particles containing the pentasil. The phosphorus stabilizes the pentasil's surface area and activity with respect to converting molecules in the gasoline range and thereby enhances the olefin yields in an FCC process. Phosphorus-containing compounds suitable for this invention include phosphoric acid ($H_3PO_4$), phosphorous acid ($H_3PO_3$), salts of phosphoric acid, salts of phosphorous acid and mixtures thereof. Ammonium salts such as monoammonium phosphate ($NH_4$)$H_2PO_4$, diammonium phosphate ($NH_4$)$_2HPO_4$, monoammonium phosphite ($NH_4$)$H_2PO_3$, diammonium phosphite ($NH_4$)$_2HPO_3$, and mixtures thereof can also be used. Other suitable phosphorous compounds are described in WO 98/41595, the contents of which are incorporated herein by reference. Those compounds include phosphines, phosphonic acid, phosphonates and the like.

For embodiments containing phosphorous, the phosphorous is added in amounts such that the catalyst composition generally comprises about 1 to 12% by weight phosphorus. In embodiments wherein the Y-type zeolite and pentasil are in separate particles, the phosphorus is typically present in the pentasil-containing particles and typically present in such particles in an amount ranging from about 6 to 24% by weight.

As mentioned earlier, the catalyst of this invention is preferably prepared by combining separately prepared Y-type zeolite catalyst and pentasil catalyst. The two catalyst components should be selected so that the amount and ratios of Y-type zeolite and pentasil are as follows:
  a. about 12 to about 60% by weight Y-type zeolite;
  b. at least about 10% by weight pentasil such that the ratio of pentasil and Y-type zeolite is at least 0.25, but no more than 3.0; and
  c. the amount of Y-type zeolite and pentasil is at least about 35% by weight of the catalyst composition.

Relatively high pentasil, e.g., ZSM-5, content additives are especially suitable when preparing embodiments comprising two separate zeolite components. Catalysts comprising at least 30% by weight pentasil are described in WO 2002/0049133, the contents of which are incorporated by reference, and are particularly suitable. These catalysts not only provide a relatively high concentration of the pentasil necessary to make the invention, but also are made in a manner such that they have relatively superior attrition resistance.

Such high pentasil content catalysts can be combined with highly active Y-type zeolite catalysts such as those described in WO 02/083304, the contents of which are incorporated by reference. Briefly, the term "kinetic conversion activity" refers to the activity of the catalyst after being deactivated and measured in accordance with ASTM microactivity test (ASTM-5154) at a catalyst to oil ratio such as that described in Table 1 of WO 02/083304. The kinetic conversion activity is reported and measured as a percentage conversion of heavy hydrocarbon feedstock (i.e., the percentage of product formed from a unit of feedstock wherein product is coke and formed material having a boiling point of up to 221° C.) divided by the quantity of 100 minus the percentage conversion of the heavy feedstock. While the exact kinetic conversion activity of a catalyst depends on the particular zeolites present, a preferred catalyst composition of this invention, e.g., those comprising both Y-type zeolite and pentasil, exhibits high kinetic conversion activity of at least about 2.3, preferably at least 3, normally between about 3.5 to about 5.5, and with from 4 to 5 more preferable because they can be readily attained. A high kinetic conversion activity provides a means for more efficiently and effectively converting feedstock to desired gasoline range olefinic molecules having boiling points of up to about 220° C. Such activity is primarily attained through the amount of Y-type zeolite added to the catalyst. For example, catalyst compositions having a kinetic conversion activity of at least 2.3 generally comprise at least 20% by weight Y-type zeolite. To attain catalysts having activities of at least 3 and activities in the range of about 3.5 to about 5.5, the catalyst compositions generally comprise at least 25%, more preferably 30% and most preferably 35% by weight Y-type zeolite. The kinetic conversion activity of the catalyst can also be modified, and higher activities can be attained, by the inclusion of rare earth into the catalyst composition.

Both the Y-type zeolite and pentasil catalysts are prepared using manufacturing methods known to those skilled in the art.

For example, methods for preparing the pentasil component of the invention are described in WO 02/0049133. Briefly, a method for preparing the pentasil component comprises:
a. preparing an aqueous slurry comprising pentasil, optionally, phosphorous-containing compound, matrix, and any other additional components, in amounts which will result in a final dried product of step (b) having from about 30-85% pentasil, and about 0-24% by weight phosphorous (as measured $P_2O_5$);
b. spray drying the slurry of step (a) at a low pH, such as a pH of less than about 3, preferably less than about 2; and
c. recovering a spray-dried product.

Methods for slurrying, milling, spray drying, calcining, and recovering particles suitable as a catalyst are also known in the art. See U.S. Pat. No. 3,444,097, as well as WO 98/41595 and U.S. Pat. No. 5,366,948. The catalyst particle size should be in the range of 20-200 microns, and have an average particle size of 60-100 microns. The pentasil component should therefore be made to have an average particle size in that range.

To prepare the Y-type zeolite component, a slurry may be formed by deagglomerating a suitable Y-type zeolite, preferably in an aqueous solution. A slurry of matrix may be formed by mixing the desired optional components mentioned above such as clay and/or other inorganic oxides in an aqueous solution. The zeolite slurry and any slurry of optional components, e.g., matrix, are then mixed thoroughly and spray dried to form catalyst particles, for example, having an average particle size of less than 200 microns in diameter, preferably in the ranges mentioned above for the pentasil component. The Y-type zeolite component may also include phosphorous or a phosphorous compound for any of the functions generally attributed thereto, for example, stability of the Y-type zeolite. The phosphorous can be incorporated with the Y-type zeolite as described in U.S. Pat. No. 5,378,670, the contents of which are incorporated by reference.

Catalyst composition having relatively high kinetic conversion activity can be prepared according to WO 02/083304. Highly active compositions can be prepared using Y-type zeolite catalysts comprising at least 70% USY, preferably REUSY, with remainder of the catalyst being binder and/or matrix.

As described above, the pentasil and Y-type zeolite comprises at least about 35% by weight of the composition. The remaining portion of the catalyst, 65% or less, comprise preferred optional components such as phosphorous, matrix, and rare earth, as well as other optional components such as binder, metals traps, and other types of components typically found in products used in FCC processes. These optional components can be alumina sol, silica sol, and peptized alumina binders for the Y-type zeolite. Alumina sol binders, and preferably alumina hydrosol binders, are particularly suitable.

The binder may also comprise a metal phosphate binder wherein the metal can be selected from the group consisting of Group IIA metals, lanthanide series metals, including scandium, yttrium, lanthanum, and transition metals. In certain embodiments Group VIII metal phosphates are suitable. A method for making metal phosphates is known to those skilled in the art and described in pending U.S. patent application Ser. No. 10/817,069, filed Apr. 2, 2004, the contents of which are incorporated by reference. Aluminum phosphate binders such as those disclosed in U.S. Pat. Nos. 5,194,412 and 5,286,369. are also suitable.

Briefly, the phosphates in the above-mentioned metal phosphate binders are prepared by mixing in water a metal salt and a source of phosphorus. When using such binders the metal salt and source of phosphorous can be added to an aqueous slurry containing the Y-type zeolite, the pentasil, mixtures thereof and/or optionally matrix. The metal salt used to make the invention may be metal nitrate, chloride, or another suitable soluble metal salt. The metal salt could also be a mixture of two or more metal salts where the two or more metals are capable of forming phosphates. The metal salt is combined with a source of phosphorus in amounts to obtain a M (is a cation) to $PO_4$ ratio of 0.5 to 2.0 and preferably 1 to 1.5, a pH of below 7 and preferably below 5, more preferably below 3, and a solid concentration of 4 to 25 wt. % as metal phosphate. In general, the metal salt is usually in the form of a metal salt solution. However, as mentioned above, it is also suitable to add the metal salt as a powder to a phosphoric acid solution and then later adding water to adjust the concentration of the metal salt to the desired levels.

The phosphorus source should be in a form that will ultimately react with the aforementioned metal to form a metal phosphate binder. For example, the phosphorus source in typical embodiments should be one that remains soluble prior to being spray dried. Otherwise, if the phosphorus source or its resulting phosphate precipitates out of solution prior to spray drying, it will not likely result in an effective binder being formed during spray drying. In typical embodiments, the phosphorus source will be phosphoric acid. Another suitable phosphorus source is $(NH_4)H_2PO_4$.

The catalyst composition preferably has an attrition resistance suitable to withstand conditions typically found in FCC processes. Preparing catalysts to have such properties is known in the art and measurement of this property is often made using the Davison Attrition Index. To determine the Davison Attrition Index (DI) of the invention 7.0 cc of sample catalyst is screened to remove particles in the 0 to 20 micron range. Those remaining particles are then contacted in a hardened steel jet cup having a precision bored orifice through which an air jet of humidified (60%) air is passed at 21 liter/minute for 1 hour. The DI is defined as the percent of 0-20 micron fines generated during the test relative to the amount of >20 micron material initially present, i.e., the formula below.

$$DI = 100 \times \frac{\text{wt \% of 0-20 micron material formed during test}}{\text{wt of original 20 microns or greater material before test}}$$

The lower the DI number, the more attrition resistant is the catalyst. Commercially acceptable attrition resistance is indicated by a DI of less than about 20, preferably less than 10, and most preferably less than 5.

If the catalyst of this invention is to comprise integral particles, such particles can be prepared by incorporating the pentasil and Y-type zeolite component in the same spray drier feed at concentrations that result in the concentrations and ratios described earlier. Another integrated embodiment could comprise incorporating separately prepared pentasil or Y-type zeolite particles into a spray drier feed for the other.

Based on the foregoing, the following especially preferred embodiments of the catalyst will comprise
 a. about twelve to about sixty percent by weight Y-type zeolite;
 b. at least about ten percent by weight pentasil wherein pentasil and Y-type zeolite is present in a weight ratio (pentasil:Y-type zeolite is present in a weight ratio (pentasil:Y-type zeolite) of at least 0.25 and no more than 3.0; wherein the Y-type zeolite and pentasil are contained in separate particles, and the Y-type zeolite and pentasil comprise at least thirty-five percent by weight of the catalyst composition;
 c. about one to about twelve percent phosphorous as measured by $P_2O_5$ content;
 d. about 0.5 to about 6% rare earth, with the Y-type zeolite-containing particles comprising about 1 to about 8% rare earth as measured by rare earth oxide content;
 e. matrix having a surface area of at least 25 $m^2/g$;
 f. a Davison Index of about 20 or less; and
 g. a kinetic conversion activity of at least about 2.3.

Even more preferred embodiments of the catalyst just described above will comprise one or more of the following features.
 a. at least about 25%, more preferably at least 30 and most preferably 35% by Y-type zeolite;
 b. about 10 to about 30%, more preferably 10 to about 20% pentasil;
 c. Y-type zeolite particles comprising about 2 to about 8% rare earth;
 d. a total surface area of at least 150 $m^2/g$;
 e. a Davison Index less than about 10, more preferably less than 5; and
 f. a kinetic conversion activity of at least 3.0, and more preferably in the range of about 3.5 to about 5.5.

Use in Cracking Processes

The catalyst of this invention is particularly suitable for use in conventional FCC processes where hydrocarbon feedstocks are cracked into lower molecular weight compounds, i.e., gasoline, in the absence of added hydrogen. Typical FCC processes entail cracking a hydrocarbon feedstock in a cracking reactor unit (FCCU) or reactor stage in the presence of fluid cracking catalyst particles to produce liquid and gaseous product streams. The product streams are removed and the catalyst particles are subsequently passed to a regenerator stage where the particles are regenerated by exposure to an oxidizing atmosphere to remove contaminant. The regenerated particles are then circulated back to the cracking zone to catalyze further hydrocarbon cracking. In this manner, an inventory of catalyst particles is circulated between the cracking stage and the regenerator stage during the overall cracking process.

The catalyst of this invention can be added to the FCCU without changing the mode of operating the aforementioned process. Alternatively, the invention can be used in an FCCU having conditions modified to enhance olefin yields. The catalyst may be added directly to the cracking stage, to the regeneration stage of the cracking apparatus or at any other suitable point. The catalyst may be added to the circulating catalyst particle inventory while the cracking process is underway or they may be present in the inventory at the start-up of the FCC operation. As an example, the compositions of this invention can be added to a FCCU when replacing existing equilibrium catalyst inventory with fresh catalyst. The replacement of equilibrium zeolite catalyst by fresh catalyst is normally done on a cost versus activity basis. The refiner usually balances the cost of introducing new catalyst to the inventory with respect to the production of desired hydrocarbon product fractions. Under FCCU reactor conditions carbocation reactions occur to cause molecular size reduction of the petroleum hydrocarbon feedstock introduced into the reactor. As fresh catalyst equilibrates within an FCCU, it is exposed to various conditions, such as the deposition of feedstock contaminants produced during that reaction and severe regeneration operating conditions. Thus, equilibrium catalysts may contain high levels of metal contaminants, exhibit somewhat lower activity, have lower aluminum atom content in the zeolite framework and have different physical properties than fresh catalyst. In normal operation, refiners withdraw small amount of the equilibrium catalyst from the regenerators and replace it with fresh catalyst to control the quality (e.g., its activity and metal content) of the circulating catalyst inventory.

When using this invention, a FCC unit can be run using conventional conditions, wherein the reaction temperatures range from about 400° to 700° C. with regeneration occurring at temperatures of from about 500° to 900° C. The particular conditions depend on the petroleum feedstock being treated, the product streams desired and other conditions well known to refiners. For example, lighter feedstock can be cracked at lower temperatures. The catalyst (i.e., inventory) is circulated through the unit in a continuous manner between catalytic cracking reaction and regeneration while maintaining the equilibrium catalyst in the reactor. Certain embodiments of the invention have been shown to be effective in units operating at somewhat severe conditions.

The invention can be used in other cracking processes that employ ZSM-5-containing catalysts. While designed for use in FCC processes conducted at conventional to somewhat more severe conditions, the invention can be used in other sometimes much more severe operations. These processes include those known as Deep Catalytic Cracking (DCC), Catalytic Pyrolysis Process (CPP), and Ultra Catalytic Cracking (UCC). Conditions for these processes, and typical FCC conditions, are listed in the table below.

|  | FCC | DCC | CPP | UCC |
|---|---|---|---|---|
| Temperature, ° C. | 500-550 | 505-575 | 560-650 | 550-570 |
| Cat./Oil | 5 to 10 | 9 to 15 | 15-25 | 18 to 22 |
| Pressure, atmospheres | 1 to 2 | 0.7 to 1.5 | 0.8 | 1 to 4 |
| Steam Dilution, wt % of feed | 1 to 5 | 10 to 30 | 30 to 50 | 20 to 35 |
| WHSV* | 125-200 | 0.2-20 | — | 50 to 80 |

*weight hourly space velocity ($hr^{-1}$)

Those of ordinary skill in the art are familiar as to when such processes can be used with the invention. When the invention is used in such processes, certain modifications to the invention may be required, e.g., activity and attrition may require alteration, in order to optimize the compositions' effectiveness in those processes. Such modifications are known to those skilled in the art.

The invention can be used to crack a variety of hydrocarbon feedstocks.

Typical feedstocks include in whole or in part, a gas oil (e.g., light, medium, or heavy gas oil) having an initial boiling point above about 120° C. [250° F.], a 50% point of at least about 315° C. [600° F.], and an end point up to about 850° C. [1562° F.]. The feedstock may also include deep cut gas oil, vacuum gas oil, thermal oil, residual oil, cycle stock, whole top crude, tar sand oil, shale oil, synthetic fuel, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure. Even high metal content resids or deeper cut gas oils having an end point of up to about 850° C. can be cracked using the invention.

The invention is particularly useful for cracking hydrocarbon feeds having natural nitrogen levels at 100 ppm or higher, which is the nitrogen content of most FCC feedstocks.

While improvement in yields vary with feedstock and FCC conditions, employing the invention in conventionally run FCC units running on typical feedstock can result in propylene yield of at least 10% based on feedstock, preferably at least 12% and most preferably at least 15%. LPG yields from processes using the invention can be at least 25% by weight of feedstock, preferably at least 30% and most preferably at least about 32%. These yields can be achieved without significantly increasing capital expenditure to modify a conventional FCC unit, nor require running the unit at extremely severe conditions. Gasoline yields using the invention are generally less than 44% by weight of the feedstock, more typically below 42% and in certain instances, less than 40%. The aforementioned yield data is based on tests run on a Davison Circulating Riser, the operating conditions of which are described later below.

To further illustrate the present invention and the advantages thereof, the following specific examples are given. The examples are given for illustrative purposes only and are not meant to be a limitation on the claims appended hereto. It should be understood that the invention is not limited to the specific details set forth in the examples.

All parts and percentages in the examples, as well as the remainder of the specification, which refers to solid compositions or concentrations, are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

The following is a list of definitions for abbreviations appearing in the examples below.
SA means total surface area.
ZSA means zeolite surface area.
MSA means matrix surface area.
BET means Brunauer, Emmett and Teller method using nitrogen adsorption for measuring surface area, including SA, ZSA, and MSA. Unless expressly indicated otherwise, all surface area measurements provided herein are BET surface area measurements made on fresh catalysts. By "fresh catalysts" it is meant the catalysts have not been calcined nor have they been subjected to hydrothermal treatment.
IBP means initial boiling point.
FBP means final boiling point.
RON means research octane number
MON means motor octane number
wt. means weight.
cc means cubic centimeter.
g means gram.
ABD means average bulk density.
EST means estimated.

EXAMPLES

Example 1

The Invention

Catalyst A, containing 45% USY zeolite, 33% clay and 22% by weight silica sol binder was prepared as follows. An aqueous slurry of USY (4 wt % $Na_2O$) was blended with Natka clay and then milled in a Drais mill. Silica sol binder was added to the milled slurry and mixed well before spray drying in a Bowen spray dryer. The silica sol binder was prepared from sodium silicate and acid alum. The resulting spray dried product was washed with ammonium sulfate solution, followed by water to give a catalyst with a $Na_2O$ level of less than 0.45 wt %. The product was steam deactivated in a fluidized bed reactor for 4 hours at 816° C. in a 100% steam at atmospheric pressure. The deactivated catalyst is designated Catalyst A-Stm.

Catalyst B, containing 40% ZSM-5, was prepared as described in US 2002/0049133. The catalyst was steam deactivated in a fluidized bed reactor for 4 hours at 816° C. in a 100% steam atmosphere. The deactivated catalyst is designated Catalyst B-Stm.

A series of different combinations of Catalyst A and Catalyst B were prepared that contained from 100% Catalyst A to 100% Catalyst B in 10% increments. The properties of the catalyst combinations are shown in Table 1. A comparison of the properties, before and after steaming, shows that the range from 70% Catalyst A/30% Catalyst B to 30% Catalyst A/70% Catalyst B, all contain greater than 10% ZSM-5, have a ZSM-5/Y ratio of greater than 0.25 and less than 3.0, and all have a fresh and steamed total surface area of greater than 150 $m^2$/g.

TABLE 1

| | | wt % Catalyst A | | | | | | | | | | |
|---|---|---|---|---|---|---|---|---|---|---|---|---|
| | | 100 | 90 | 80 | 70 | 60 | 50 | 40 | 30 | 20 | 10 | 0 |
| | | wt % Catalyst B | | | | | | | | | | |
| | | 0 | 10 | 20 | 30 | 40 | 50 | 60 | 70 | 80 | 90 | 100 |
| wt % ZSM-5 | | 0 | 4 | 8 | 12 | 16 | 20 | 24 | 28 | 32 | 36 | 40 |
| wt % Y | | 45 | 40.5 | 36 | 31.5 | 27 | 22.5 | 18 | 13.5 | 9 | 4.5 | 0 |
| ZSM-5/Y ratio | | 0 | 0.099 | 0.222 | 0.381 | 0.593 | 0.889 | 1.333 | 2.074 | 3.556 | 8 | |
| $Al_2O_3$ | wt % | 27.44 | 27.07 | 27.08 | 27.66 | 26.91 | 27.42 | 26.79 | 26.75 | 26.68 | 27.15 | 27.00 |
| $Na_2O$ | wt % | 0.385 | 0.357 | 0.34 | 0.314 | 0.299 | 0.281 | 0.244 | 0.239 | 0.211 | 0.187 | 0.162 |
| $P_2O_5$ | wt % | 0.431 | 1.5 | 2.447 | 3.511 | 4.779 | 5.964 | 6.722 | 8.32 | 9.579 | 10.44 | 11.72 |
| $RE_2O_3$ | wt % | 0.098 | 0.101 | 0.104 | 0.103 | 0.109 | 0.112 | 0.111 | 0.118 | 0.123 | 0.126 | 0.121 |
| Calcined 2 hours @ 593° C. | | | | | | | | | | | | |
| SA | $m^2/g$ | 278 | 264 | 249 | 235 | 220 | 206 | 192 | 177 | 163 | 148 | 134 |
| ZSA | $m^2/g$ | 233 | 221 | 209 | 197 | 185 | 173 | 161 | 149 | 137 | 125 | 113 |
| MSA | $m^2/g$ | 45 | 43 | 40 | 38 | 35 | 33 | 31 | 28 | 26 | 23 | 21 |
| Steamed 4 hours @816° C./100% Steam | | | | | | | | | | | | |
| SA | $m^2/g$ | 206 | 200 | 193 | 187 | 181 | 175 | 168 | 162 | 156 | 149 | 143 |
| ZSA | $m^2/g$ | 171 | 165 | 158 | 152 | 145 | 139 | 133 | 126 | 120 | 113 | 107 |
| MSA | $m^2/g$ | 35 | 35 | 35 | 35 | 35 | 36 | 36 | 36 | 36 | 36 | 36 |

The steamed catalyst combinations were tested in an ACE Model AP Fluid Bed Microactivity unit on a paraffinic feed (properties listed in Table 2) at 549° C.

TABLE 2

| Feed Properties | |
|---|---|
| API | 30 |
| K Factor | 12.07 |
| Total Nitrogen (wt %) | 0.04 |
| Sulfur (wt %) | 0.381 |
| Conradson Carbon (wt %) | 0.05 |
| % Paraffinic Ring Carbons, (Cp) | 72.3 |
| % Naphthenic Ring Carbons, (Cn) | 5.3 |
| % Aromatic Ring Carbons, (Ca) | 22.4 |
| Simulated Distillation, Vol. %, ° C. | |
| IBP | 233 |
| 10% | 305 |
| 30% | 361 |
| 50% | 401 |
| 70% | 433 |
| 90% | 482 |
| FBP | 560 |

Figure 1:
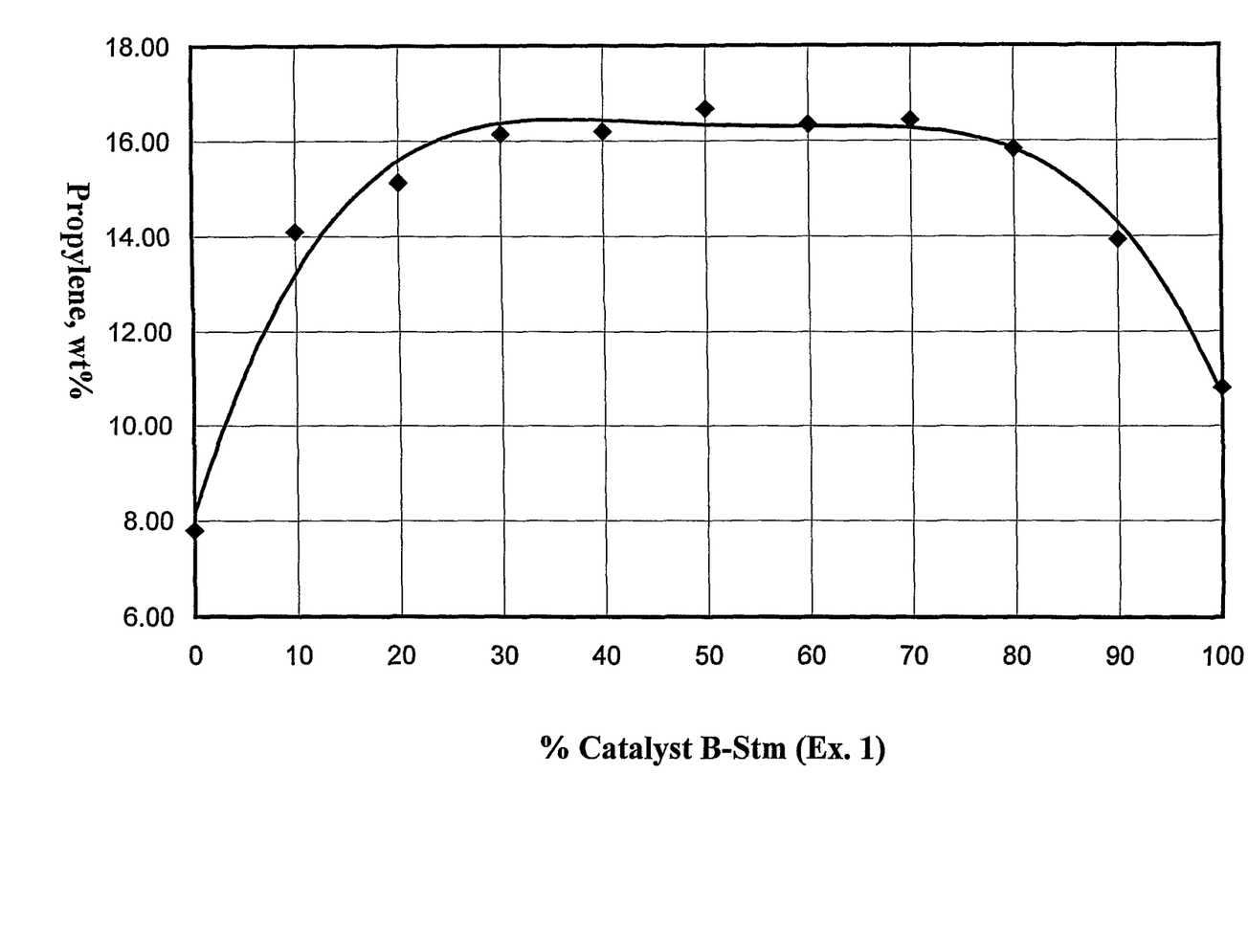
The FIGURE illustrates a propylene ($C_3$) yield of the invention versus yield from alternative catalyst compositions.

Several runs were carried out for each catalyst using catalyst to oil ratios between 3 and 10. The catalyst to oil ratio was varied by changing the catalyst weight and keeping the feed weight constant. The feed weight utilized for each run was 1.5 g and the feed injection rate was 3.0 g/minute. The ACE data at a constant catalyst to oil ratio of 7 (FIG. 1) shows that the propylene yield reaches a broad maximum centered at a 1:1 ratio of Catalyst A-Stm and Catalyst B-Stm. Propylene yields of greater than 16 wt % are achieved for combinations containing between 70% Catalyst A-Stm/30% Catalyst B-Stm and 30% Catalyst A-Stm/70% Catalyst B-Stm. The gasoline yields, for these combinations, are all less than 35 wt % (Table 3). Combinations with less than 30% Catalyst A-Stm (13.5% Y zeolite) shows a significant loss in bottoms cracking and conversion. Combinations with less than 30% Catalyst B-Stm (12% ZSM-5) produce lower amounts of propylene and LPG. The yields provided in Table 3 are percentages based on feedstock.

TABLE 3

| | Wt % Catalyst A-Stm | | | | | | | | | | |
|---|---|---|---|---|---|---|---|---|---|---|---|
| | 100 | 90 | 80 | 70 | 60 | 50 | 40 | 30 | 20 | 10 | 0 |
| | Wt % Catalyst B-Stm | | | | | | | | | | |
| Cat./Oil = 7 | 0 | 10 | 20 | 30 | 40 | 50 | 60 | 70 | 80 | 90 | 100 |
| Conversion (wt %) | 81.59 | 82.60 | 82.21 | 82.31 | 81.42 | 80.75 | 79.59 | 76.47 | 71.60 | 62.13 | 45.38 |
| Hydrogen, wt % | 0.06 | 0.05 | 0.05 | 0.05 | 0.06 | 0.06 | 0.07 | 0.06 | 0.07 | 0.07 | 0.07 |
| Ethylene, wt % | 0.76 | 1.78 | 2.37 | 3.02 | 3.41 | 3.83 | 4.17 | 4.35 | 4.41 | 4.20 | 3.47 |
| Total $C_1$'s & $C_2$'s, wt % | 1.75 | 2.71 | 3.22 | 3.90 | 4.25 | 4.65 | 4.99 | 5.10 | 5.12 | 4.92 | 4.21 |
| Total Dry Gas, wt % | 1.80 | 2.75 | 3.27 | 3.95 | 4.31 | 4.71 | 5.05 | 5.16 | 5.19 | 4.99 | 4.28 |
| Propylene, wt % | 7.79 | 14.10 | 15.13 | 16.14 | 16.19 | 16.67 | 16.34 | 16.43 | 15.83 | 13.93 | 10.81 |
| Total $C_3$'s, wt % | 9.23 | 16.38 | 17.68 | 19.04 | 19.30 | 19.98 | 20.01 | 20.10 | 19.56 | 17.47 | 13.80 |
| Total $C_4=$'s, wt % | 10.31 | 12.84 | 13.43 | 13.96 | 14.08 | 14.42 | 14.23 | 14.37 | 13.95 | 12.20 | 11.56 |
| Total $C_4$'s, wt % | 17.75 | 21.51 | 21.99 | 22.42 | 22.03 | 21.81 | 21.23 | 20.34 | 19.14 | 16.09 | 14.61 |
| $C_5$+ Gasoline, wt % | 50.60 | 39.85 | 37.00 | 34.81 | 34.14 | 32.76 | 31.87 | 29.62 | 26.67 | 22.75 | 11.93 |
| RON EST | 91.65 | 94.15 | 93.87 | 93.52 | 93.16 | 92.60 | 92.14 | 91.17 | 91.40 | 88.79 | 87.40 |
| MON EST | 80.53 | 82.13 | 81.71 | 81.42 | 80.96 | 80.45 | 80.08 | 79.15 | 78.92 | 77.04 | 74.92 |
| LCO, wt % | 14.52 | 13.77 | 13.97 | 13.83 | 14.30 | 14.83 | 15.37 | 17.06 | 19.45 | 22.72 | 25.65 |

TABLE 3-continued

| | Wt % Catalyst A-Stm | | | | | | | | | | |
|---|---|---|---|---|---|---|---|---|---|---|---|
| | 100 | 90 | 80 | 70 | 60 | 50 | 40 | 30 | 20 | 10 | 0 |
| | | | | | Wt % Catalyst B-Stm | | | | | | |
| Cat./Oil = 7 | 0 | 10 | 20 | 30 | 40 | 50 | 60 | 70 | 80 | 90 | 100 |
| Bottoms, wt % | 3.88 | 3.63 | 3.82 | 3.86 | 4.28 | 4.43 | 5.04 | 6.46 | 8.95 | 15.15 | 28.97 |
| Coke, wt % | 2.21 | 2.10 | 2.26 | 2.08 | 1.65 | 1.49 | 1.43 | 1.25 | 1.05 | 0.83 | 0.77 |
| Gasoline Paraffins, wt % of feed | 2.09 | 1.71 | 1.94 | 2.11 | 2.31 | 2.49 | 2.59 | 2.74 | 2.72 | 2.89 | 2.14 |
| Gasoline Isoparaffins, wt % of feed | 12.82 | 5.86 | 4.79 | 3.83 | 3.72 | 3.30 | 3.23 | 3.07 | 2.74 | 2.20 | 0.95 |
| Gasoline Aromatics, wt % of feed | 20.66 | 22.74 | 21.36 | 21.43 | 20.03 | 19.46 | 18.58 | 16.36 | 12.82 | 11.47 | 3.81 |
| Gasoline Napthenes, wt % of feed | 4.31 | 3.53 | 3.28 | 2.99 | 2.95 | 2.77 | 2.68 | 2.35 | 1.86 | 1.40 | 0.51 |
| Gasoline Olefins, wt % of feed | 10.71 | 6.01 | 5.63 | 4.45 | 5.12 | 4.76 | 4.79 | 5.10 | 6.54 | 4.78 | 4.52 |

Example 2

Matrix Surface Area

Catalyst C, containing 55% USY, 5% Boehmite alumina and 20% alumina sol binder, 2% $RE_2O_3$ on zeolite and remainder clay, was prepared as follows. An aqueous slurry of 9.8 kg USY zeolite (1% $Na_2O$, 34% solids) was blended with 367 g of rare earth salt solution (27% $RE_2O_3$), 300 g (dry basis) of a particulate Boehmite alumina, 1200 g Natka clay (dry basis) and 5.2 kg of aluminum hydrochlorol (23% $Al_2O_3$). The slurry was mixed well and then milled in a Drais mill. The milled catalyst slurry was spray dried in a Bowen spray drier. The spray-dried product was calcined for 40 minutes at 400° C. The calcined product was then washed using conventional techniques to lower the $Na_2O$ level. The catalyst was steamed in a fluidized bed reactor for 4 hours at 816° C. in a 100% steam atmosphere. The deactivated Catalyst C was combined in a 1:1 ratio with Catalyst B-Stm. The catalyst combination is designated Catalyst CB-Stm. The surface area of Catalyst CB-Stm is shown in Table 4. The yields provided in Table 4 are percentages based on feedstock.

TABLE 4

| | Catalyst CB-Stm | Catalyst DB-Stm |
|---|---|---|
| Total Surface Area (m²/g) | 203 | 187 |
| Zeolite Surface Area (m²/g) | 149 | 146 |
| Matrix Surface Area (m²/g) | 54 | 41 |
| Cat./Oil Ratio | 7.4 | 7.4 |
| Conversion, wt. % | 77.2 | 77.2 |
| Hydrogen, wt % | 0.09 | 0.07 |
| Ethylene, wt % | 4.09 | 3.85 |
| Propylene, wt % | 15.65 | 15.11 |
| Total $C_3$'s, wt % | 18.22 | 17.69 |
| Total $C_4$='s, wt % | 12.68 | 12.33 |
| Total $C_4$'s, wt % | 18.18 | 18.37 |
| $C_5$+ Gasoline, wt % | 31.50 | 32.36 |
| RON EST | 96.79 | 96.87 |
| MON EST | 83.73 | 83.87 |
| Gasoline Paraffins, wt % of feed | 1.20 | 1.17 |
| Gasoline Isoparaffins, wt % of feed | 2.73 | 2.86 |
| Gasoline Aromatics, wt % of feed | 21.50 | 22.12 |
| Gasoline Napthenes, wt % of feed | 2.26 | 2.44 |
| Gasoline Olefins, wt % of feed | 3.77 | 3.71 |
| LCO, wt % | 16.93 | 16.74 |
| Bottoms, wt % | 5.90 | 6.09 |
| Coke, wt % | 3.63 | 3.44 |

Example 3

Catalyst D, containing 55% USY, 20% alumina sol binder, 5% Boehmite alumina and 2% $RE_2O_3$ on zeolite was prepared as follows. An aqueous slurry of USY (1% $Na_2O$ on zeolite) was blended with aluminum chlorohydrol, Boehmite alumina, rare earth salt, and Natka clay. The slurry was mixed well and then milled in a Drais mill. The milled catalyst slurry was spray dried in a Bowen spray drier. The spray-dried product was calcined for 40 minutes at 593° C. The catalyst was steamed in a fluidized bed reactor for 4 hours at 816° C. in a 100% steam atmosphere. The deactivated Catalyst D was combined in a 1:1 ratio with Catalyst B-Stm. The catalyst combination is designated Catalyst DB-Stm. The surface area of Catalyst DB-Stm is shown in Table 4.

Example 4

The deactivated Catalysts CB-Stm and DB-Stm were tested in the ACE unit on gas oil feed (Table 5) at 549° C.

TABLE 5

| Feed Properties | |
|---|---|
| API | 25.5 |
| K Factor | 11.94 |
| Total Nitrogen (wt %) | 0.12 |
| Sulfur (wt %) | 0.369 |
| Conradson Carbon (wt %) | 0.68 |
| % Paraffinic Ring Carbons, (Cp) | 63.6 |
| % Naphthenic Ring Carbons, (Cn) | 17.4 |
| % Aromatic Ring Carbons, (Ca) | 18.9 |
| Simulated Distillation, Vol. %, ° C. | |
| IBP | 153 |
| 10% | 319 |
| 30% | 393 |
| 50% | 437 |
| 70% | 484 |
| 90% | 557 |
| FBP | 681 |

The ACE unit conditions are described in Example 1. The ACE data (Table 4) shows that Catalyst CB-Stm, with the higher matrix surface area, produces more propylene and more butylenes than Catalyst DB-Stm, which has lower matrix surface area, but which at 41 m²/g also provides satisfactory yields.

Example 5

Rare Earth

Catalyst E containing 55% USY, 30% alumina sol binder, 5% particulate Boehmite alumina, and 10% clay was prepared as follows. An aqueous slurry of USY zeolite (1 wt % $Na_2O$ on zeolite) was blended with aluminum chlorohydrol, particulate alumina, and Natka clay. The slurry was mixed well and then milled in a Drais mill. The milled catalyst slurry was spray dried in a Bowen spray drier. The spray-dried product was calcined for 40 minutes at 400° C. The catalyst was then washed to remove additional $Na_2O$.

Example 6

Catalysts F and G, were prepared with 45% USY zeolite, 5% particulate Boehmite alumina, 20% alumina sol binder and 29% clay. The catalysts contained 1.8% and 3.6% $RE_2O_3$/zeolite, respectively. To prepare the catalysts, an aqueous slurry of USY was blended with aluminum chlorohydrol, particulate alumina and Natka clay and a rare earth salt. The slurry was mixed well and then milled in a Drais mill. The milled catalyst slurry was spray dried in a Bowen spray drier. The spray-dried product was calcined for 40 minutes at 400° C. The catalyst was then washed to remove $Na_2O$.

Example 7

Catalyst H was prepared with 60% USY zeolite, 35% alumina sol binder and 2% clay. The catalyst was prepared with 4.7% $RE_2O_3$/zeolite. To prepare the catalyst, an aqueous slurry of USY was blended with aluminum chlorohydrol, a rare earth salt and Natka clay. The slurry was mixed well and then milled in a Drais mill. The milled catalyst slurry was spray dried in a Bowen spray drier. The spray-dried product was calcined for 40 minutes at 400° C. The catalyst was then washed to remove $Na_2O$.

Example 8

The performance evaluation of Catalysts E, F, G, and H was conducted by using the Davison Circulating Riser (DCR). The description and operation of this unit has been discussed in detail in the following publications: 1) G. W. Young, G. D. Weatherbee, and S. W. Davey, "Simulating Commercial CCU yields with the Davison Circulating Riser (DCR) pilot plant unit," National Petroleum Refiners Association (NPRA) Paper AM88-52; and 2) G. W. Young, "Realistic Assessment of FCC Catalyst Performance in the Laboratory," in Fluid Catalytic Cracking: Science and Technology, J. S. Magee and M. M. Mitchell, Jr. Eds., Studies in Surface Science and Catalysis, Volume 76, p. 257, Elsevier Science Publishers B.V., Amsterdam 1993, ISBN 0-444-89037-8.

A commercial FCC feed was used for testing and its properties are shown in Table 6.

TABLE 6

| Feed Properties | |
|---|---|
| API Gravity @60° F. | 24.6 |
| Sulfur, wt. % | 0.358 |
| Conradson Carbon, wt. % | 0.27 |
| K Factor | 11.95 |
| % Paraffinic Ring Carbons, (Cp) | 62.6 |
| % Naphthenic Ring Carbons, (Cn) | 16.1 |
| % Aromatic Ring Carbons, (Ca) | 21.3 |
| Simulated Distillation, vol. %, ° C. | |
| IBP | 226 |
| 10 | 359 |
| 30 | 407 |
| 50 | 442 |
| 70 | 479 |
| 90 | 534 |
| FBP | 619 |

In each of the experiments, the DCR was operated under "full burn" regeneration conditions, where "full burn" is defined as the condition wherein the amount of air added to the regenerator is sufficient to convert all the coke species on the spent FCC catalyst to $CO_2$.

Catalysts E, F, G, and H were hydrothermally deactivated in a fluidized bed reactor with 100% steam for 4 hours at 816° C. Catalyst B (40% ZSM-5) was hydrothermally deactivated in a fluidized bed reactor with 100% steam for 24 h at 816° C. Steamed catalyst combinations of 70% Catalyst F: 30% Catalyst B (Catalyst FB-Stm); 70% Catalyst G: 30% Catalyst B (Catalyst GB-Stm); 70% Catalyst H: 30% Catalyst B (Catalyst HB-Stm) were prepared. Since Catalyst E does not contain any $RE_2O_3$, and therefore has lower cracking activity, it was combined with only 18% Catalyst B (Catalyst EB-Stm). The steam deactivated properties of the catalyst combinations are shown in Table 7.

TABLE 7

| | | Catalyst EB-Stm | Catalyst FB-Stm | Catalyst GB-Stm | Catalyst HB-Stm |
|---|---|---|---|---|---|
| $Al_2O_3$ | wt. % | 45.78 | 42.11 | 41.30 | 41.56 |
| $RE_2O_3$ | wt. % | 0.03 | 0.69 | 1.28 | 1.98 |
| $Na_2O$ | wt. % | 0.48 | 0.28 | 0.27 | 0.32 |
| Fe | wt. % | 0.24 | 0.32 | 0.31 | 0.19 |
| $TiO_2$ | wt. % | 0.25 | 0.37 | 0.36 | 0.07 |
| $P_2O_5$ | wt. % | 2.13 | 3.54 | 3.51 | 3.51 |
| SA | $m^2$/g | 239 | 223 | 222 | 263 |
| Zeolite | $m^2$/g | 146 | 137 | 137 | 167 |
| Matrix | $m^2$/g | 93 | 86 | 85 | 96 |
| Unit Cell | | 24.24 | 24.26 | 24.27 | 24.29 |
| ABD | g/cc | 0.70 | 0.66 | 0.67 | 0.67 |
| DI | | 6 | 11 | 14 | 8 |

The DCR was charged initially with approximately 1800 g of each catalyst combination. The conditions used were a riser top temperature of 545° C., a regenerator temperature of 727° C. with 1% excess $O_2$ in the regenerator (and operating in full combustion mode). The conversion to useful products, was varied by changing the feed preheat temperature prior to introduction into the unit. Steady state yields were determined at each conversion for all the catalysts. The results of the DCR study are provided in Table 8. The yields provided in Table 8 are percentages based on feedstock.

TABLE 8

| | Catalyst EB-Stm | Catalyst FB-Stm | Catalyst GB-Stm | Catalyst HB-Stm |
|---|---|---|---|---|
| wt. % RE$_2$O$_3$/Y Zeolite | 0.0 | 1.8 | 3.6 | 4.7 |
| Cat./Oil | 8.5 | 8.5 | 8.5 | 8.5 |
| Conversion, wt % | 76.00 | 78.13 | 79.66 | 80.10 |
| H$_2$ Yield, wt % | 0.05 | 0.05 | 0.05 | 0.04 |
| C$_1$ + C$_2$'s, wt % | 3.24 | 3.07 | 3.22 | 3.21 |
| C$_2$=, wt % | 1.35 | 1.40 | 1.49 | 1.49 |
| Total C$_3$, wt % | 11.87 | 12.86 | 13.27 | 13.23 |
| C$_3$=, wt % | 10.88 | 11.79 | 12.02 | 11.93 |
| Total C$_4$, wt % | 15.66 | 16.68 | 17.23 | 17.17 |
| Total C$_4$, = wt % | 12.66 | 12.70 | 12.35 | 11.90 |
| LPG, wt % | 27.53 | 29.54 | 30.49 | 30.40 |
| Gasoline, wt % | 42.87 | 42.54 | 42.41 | 42.65 |
| Gasoline Paraffins, wt % of feed | 2.69 | 2.71 | 2.76 | 2.81 |
| Gasoline Isoparaffins, wt % of feed | 14.82 | 17.07 | 19.43 | 20.81 |
| Gasoline Aromatics, wt % of feed | 34.04 | 36.33 | 37.96 | 38.88 |
| Gasoline Napthenes, wt % of feed | 7.28 | 7.62 | 7.67 | 7.74 |
| Gasoline Olefins, wt % of feed | 41.17 | 36.27 | 32.18 | 29.76 |
| RON EST | 96.51 | 96.48 | 96.37 | 96.32 |
| MON EST | 81.53 | 82.12 | 82.57 | 82.85 |
| LCO, wt % | 17.54 | 16.22 | 15.17 | 14.91 |
| Bottoms, wt % | 6.47 | 5.66 | 5.17 | 4.99 |
| Coke, wt % | 2.22 | 2.83 | 3.38 | 3.70 |

The DCR data (Table 8) shows that the Catalyst EB-Stm combination, which does not contain RE$_2$O$_3$, has lower cracking activity and therefore makes less propylene and LPG than the other catalysts. The propylene and LPG yields increase as the RE$_2$O$_3$ on Y zeolite increases above 1.8 wt %. The catalysts all make less than 43 wt % gasoline.

We claim:

1. A catalyst composition comprising
   a. about twelve to about sixty percent by weight Y-type zeolite;
   b. at least about ten percent by weight pentasil and wherein pentasil and Y-type zeolite is present in a weight ratio (pentasil:Y-type zeolite) of at least 0.25 and no more than 2.3; and
   c. the Y-type zeolite and pentasil comprises at least about thirty-five percent by weight of the catalyst composition; and wherein the pentasil and the Y-type zeolite are contained in separate particles, and the separate particles of Y-type zeolite comprise two to eight percent by weight rare earth (measured as rare earth oxide) based on the Y type zeolite.

2. A catalyst composition according to claim 1 wherein the composition further comprises phosphorus.

3. A catalyst composition according to claim 2 wherein the composition comprises up to about 12% by weight phosphorus, as measured by the content of P$_2$O$_5$.

4. A catalyst composition according to claim 1 wherein the composition further comprises matrix having a surface area of at least 25 m$^2$/g.

5. A catalyst composition according to claim 2 wherein the pentasil-containing particles comprise phosphorus.

6. A catalyst composition according to claim 5 wherein the pentasil-containing particles comprises phosphorus in amounts in the range of about six to about twenty-four % by weight, as measured by the content of P$_2$O$_5$.

7. A catalyst composition according to claim 2 wherein the Y-type zeolite-containing particles comprise phosphorus.

8. A catalyst composition according to claim 7 wherein the Y-type zeolite-containing particles comprise 0.01 to about 3 weight percent phosphorus as measured by P$_2$O$_5$.

9. A catalyst composition according to claim 1 wherein the composition has a surface area of at least 150 m$^2$/g.

10. A catalyst composition according to claim 1 wherein the composition has a surface area of at least 150 m$^2$/g after being treated at 816° C. for 4 hours with 100% steam.

11. A catalyst composition according to claim 1 comprising about ten percent to about fifty percent by weight pentasil.

12. A catalyst composition according to claim 1 having a Davison Attrition Index of about 20 or less.

13. A catalyst composition according to claim 1 having a Davison Attrition Index of about 10 or less.

14. A catalyst composition according to claim 1 having a Davison Attrition Index of about 5 or less.

15. A catalyst composition according to claim 1 wherein (a) the pentasil-containing particles comprise phosphorous, and (b) the catalyst further comprises matrix having a surface area of at least 25 m$^2$/g.

16. A catalyst composition according to claim 15 comprising about one to about twelve percent by weight phosphorous.

17. A catalyst composition according to claim 15 comprising matrix having a surface area in the range of about 45 to about 130 m$^2$/g.

18. A catalyst composition according to claim 15 having a total surface area of at least about 150 m$^2$/g.

19. A catalyst composition according to claim 16 having a surface area of at least about 150 m$^2$/g.

20. A catalyst composition according to claim 15 comprising about ten to about fifty weight percent pentasil.

21. A catalyst composition according to claim 20 wherein the pentasil is ZSM-5 or ZSM-11.

22. A catalyst composition according to claim 16 wherein the Y-type zeolite is exchanged with cerium cations, lanthanum cations, neodymium cation, praseodymium cations, or mixtures thereof.

23. A catalyst composition according to claim 1 wherein the catalyst composition has a kinetic conversion activity of at least about 2.3.

24. A catalyst composition according to claim 1 wherein the catalyst composition has a kinetic conversion activity of at least about 3.

25. A catalyst composition according to claim 1 wherein the catalyst composition has a kinetic conversion activity in the range of about 3.5 to about 5.5.

26. A catalyst composition according to claim 1 wherein the catalyst composition has a kinetic conversion activity in the range of about 4 to about 5.

27. A catalytic cracking process comprising:
 a. introducing a hydrocarbon feedstock into a reaction zone of a catalytic cracking unit comprised of a reaction zone, stripping zone, and a regeneration zone, which feedstock is characterized as having an initial boiling point from about 120° C. with end points up to about 850° C.;
 b. catalytically cracking said feedstock in said reaction zone at a temperature from about 400° C. to about 700° C., by causing the feedstock to be in contact with a cracking catalyst comprising:
  i. about twelve to about sixty percent by weight Y-type zeolite;
  ii. two to eight percent by weight rare earth (measured as rare earth oxide) based on the Y-type zeolite;
  iii. at least about ten percent by weight pentasil and wherein pentasil and Y-type zeolite is present in a weight ratio pentasil:Y-type zeolite of at least 0.25 and no more than 2.3;
  iv. the Y-type zeolite and pentasil comprises at least about thirty-five percent by weight of the catalyst composition; and wherein the pentasil and the Y-type zeolite are contained in separate particles, and the separate particles of Y-type zeolite comprise two to eight percent by weight rare earth (measured as rare earth oxide) based on the Y type zeolite; and
 c. stripping recovered used catalyst particles with a stripping fluid in a stripping zone to remove therefrom some hydrocarbonaceous material; and
 d. recovering stripped hydrocarbonaceous material from the stripping zone and circulating stripped used catalyst particles to the regenerator or regeneration zone; and
 e. regenerating said coked catalyst in a regeneration zone by burning-off a substantial amount of the coke on said catalyst, and with any added fuel component to maintain the regenerated catalyst at a temperature which will maintain the catalytic cracking reactor at a temperature from about 400° C. to about 700° C.; and
 f. recycling said regenerated hot catalyst to the reaction zone.

28. A process according to claim 27 wherein the catalyst in step (b) further comprises phosphorous.

29. A process according to claim 27 wherein the catalyst in step (b) further comprises matrix having a surface area of at least 25 m$^2$/g.

30. A process according to claim 27 wherein the process is a fluidized catalytic cracking process.

31. A process according to claim 30 wherein the pentasil-containing particles comprise phosphorus.

32. A process according to claim 31 wherein the Y-type zeolite-containing particles comprise phosphorus.

33. A process according to claim 31 wherein the catalyst in step (b) comprises phosphorous in amounts in the range of about one to about twelve % by weight, as measured by the content of $P_2O_5$.

34. A process according to claim 31 wherein the pentasil-containing particles comprises phosphorus in amounts in the range of about six to about twenty-four % by weight, as measured by the content of $P_2O_5$.

35. A process according to claim 27 wherein the catalyst in step (b) has a surface area of at least 150 m$^2$/g.

36. A process according to claim 27 wherein the catalyst in step (b) has a surface area of at least 150 m$^2$/g after being treated at 1500° F. for 4 hours with 100% steam.

37. A process according to claim 27 wherein the catalyst in step (b) comprises about ten percent to about fifty percent by weight pentasil.

38. A process according to claim 27 wherein the catalyst in step (b) has a Davison Attrition Index of about 20 or less.

39. A process according to claim 27 wherein the catalyst in step (b) has a Davison Attrition Index of about 10 or less.

40. A process according to claim 27 wherein the catalyst in step (b) has a Davison Attrition Index of about 5 or less.

41. A process according to claim 30 wherein the catalyst in step (b) comprises (a) pentasil-containing particles comprising phosphorous, and (b) matrix having a surface area of at least 25 m$^2$/g.

42. A process according to claim 41 wherein the catalyst in step (b) comprises about one to about twelve percent by weight phosphorous.

43. A process according to claim 41 wherein the catalyst in step (b) comprises matrix having a surface area in the range of about 45 to about 130 m$^2$/g.

44. A process according to claim 41 wherein the catalyst in step (b) has a surface area of at least about 150 m$^2$/g.

45. A process according to claim 43 wherein the catalyst in step (b) has a surface area of at least about 150 m$^2$/g.

46. A process according to claim 41 wherein the catalyst in step (b) comprises about ten to about fifty weight percent pentasil.

47. A process according to claim 46 wherein the catalyst in step (b) comprises pentasil that is ZSM-5.

48. A process according to claim 46 wherein the catalyst in step (b) comprises pentasil that is ZSM-11.

49. A process according to claim 41 wherein the catalyst in step (b) comprises Y-type zeolite that is exchanged with cerium cations, lanthanum cations, neodymium cations, praseodymium cations, or mixtures thereof.

50. A process according to claim 41 wherein step (b) of said process produces a product comprising at least about ten percent by weight propylene.

51. A process according to claim 41 wherein step (b) of said process produces a product comprising at least about 12 percent by weight propylene.

52. A process according to claim 41 wherein step (b) of said process produces a product comprising at least about 15 percent by weight propylene.

53. A process according to claim 41 wherein step (b) of said process produces a product comprising at least about 16 percent by weight propylene.

54. A process according to claim 27 wherein step (b) of said process produces a product comprising light olefins comprising $C_3$ and $C_4$ olefins.

55. A process according to claim 27 wherein step (b) of said process produces at least 25% by weight liquefied petroleum gas based on the weight of the feedstock.

56. A process according to claim 27 wherein the temperature of step (b) is in the range of about 500 to about 550° C.

57. A process according to claim 30 wherein the temperature of step (b) is in the range of about 500 to about 550° C.

58. A process according to claim 27 wherein the temperature of step (b) is in the range of about 505 to about 575° C.

59. A process according to claim 27 wherein the temperature of step (b) is in the range of about 560 to about 650° C.

60. A process according to claim 27 wherein the temperature of step (b) is in the range of about 550 to about 570° C.

61. A process according to claim 27 wherein the yield in gasoline is less than forty four percent by weight the hydrocarbon feedstock.

62. A process according to claim 27 wherein the yield in gasoline is less than forty two percent by weight the hydrocarbon feedstock.

63. A process according to claim 27 wherein the yield in gasoline is less than forty percent by weight the hydrocarbon feedstock.

64. A process according to claim 27 wherein the hydrocarbon feedstock has a fifty percent point of at least about 315° C.

65. A process according to claim 27 wherein the hydrocarbon feedstock comprises at least 100 ppm natural nitrogen.

66. A process according to claim 27 the catalyst in step (b) has a kinetic conversion activity of at least about 2.3.

67. A process according to claim 27 the catalyst in step (b) has a kinetic conversion activity of at least about 3.

68. A process according to claim 27 the catalyst in step (b) has a kinetic conversion activity in the range of about 3.5 to about 5.5.

69. A process according to claim 30 the catalyst in step (b) has a kinetic conversion activity in the range of about 3.5 to about 5.5.

70. A catalytic cracking process comprising:
  a. introducing a hydrocarbon feedstock into a reaction zone of a catalytic cracking unit comprised of a reaction zone, stripping zone, and a regeneration zone, which feedstock is characterized as having: an initial boiling point from about 120° C. with end points up to about 850° C.;
  b. catalytically cracking said feedstock in said reaction zone at a temperature from about 400° C. to about 700° C., by causing the feedstock to be in contact with a cracking catalyst having a Davison Index of about 20 or less and a kinetic conversion activity of at least about 2.3 and comprising:
    i. about twelve to about sixty percent by weight Y-type zeolite;
    ii. at least about ten percent by weight pentasil wherein said pentasil and Y-type zeolite is present in a weight ratio (pentasil:Y-type zeolite) of at least 0.25 and no more than 2.3; wherein the Y-type zeolite and pentasil are contained in separate particles, and the Y-type zeolite and pentasil comprise at least thirty-five percent by weight of the catalyst composition;
    iii. about one to about twelve percent phosphorus as measured by $P_2O_5$ content;
    iv. the separate particles of Y-type zeolite comprise about 2 to about 8% by weight rare earth, based on Y type zeolite, as measured by rare earth oxide content; and
    v. matrix having a surface area of at least 25 $m^2/g$;
  c. stripping recovered used catalyst particles with a stripping fluid in a stripping zone to remove therefrom some hydrocarbonaceous material; and
  d. recovering stripped hydrocarbonaceous material from the stripping zone and circulating stripped used catalyst particles to the regenerator or regeneration zone; and
  e. regenerating said coked catalyst in a regeneration zone by burning-off a substantial amount of the coke on said catalyst, and with any added fuel component to maintain the regenerated catalyst at a temperature which will maintain the catalytic cracking reactor at a temperature from about 400° C. to about 700° C.; and
  f. recycling said regenerated hot catalyst to the reaction zone.

71. A process according to claim 70 wherein the catalyst in step (b) has a Davison Index of less than about 10, an activity of at least about 3.0 and a total surface area of at least about 150 $m^2/g$ and comprises at least about 25% by weight Y-type zeolite; and about 10 to about 30% pentasil.

72. A process according to claim 71 wherein the catalyst in step (b) has a kinetic conversion activity in the range of about 3.5 to about 5.5 and comprises at least about 30% by weight percent Y-type zeolite; and about 10 to about 20% by weight pentasil.

73. A process according to claim 70 wherein the temperature in step (b) is in the range of about 500 to about 550° C.

74. A process according to claim 73 wherein step (b) produces a product comprising $C_3$ and $C_4$ olefins.

75. A process according to claim 73 wherein step (b) produces at least 25% by weight liquefied petroleum gas based on weight of feedstock.

76. A process according to claim 73 wherein step (b) produces at least 12% by weight propylene.

77. A process according to claim 75 wherein step (b) produces at least 12% by weight propylene.

78. A process according to claim 77 wherein step (b) produces about 42% by weight or less gasoline.

79. A process according to claim 70 wherein the hydrocarbon feedstock in step (a) comprises at least about 100 ppm nitrogen.

\* \* \* \* \*